H. DEACON.
Manufacture of Chlorine.

No. 85,370.  Patented Dec. 29, 1868.

WITNESSES:  INVENTOR.

HENRY DEACON, OF APPLETON HOUSE, APPLETON, ENGLAND.

Letters Patent No. 85,370, dated December 29, 1868.

IMPROVEMENT IN THE MANUFACTURE OF CHLORINE.

The Schedule referred to in these Letters Patent and making part of the same.

*To whom it may concern:*

Be it known that I, HENRY DEACON, of Appleton House, Appleton, in the county of Lancaster, England, have invented certain new and useful Improvements in the Manufacture of Chlorine; and I hereby declare the following to be a full, clear, and exact description of the same.

My improvements consist in the continuous production of chlorine, by passing a current of hydrochloric-acid gas and atmospheric air over a mixture of oxide of copper and oxide of manganese, or of such other metallic compounds as are hereafter referred to, and which I find will produce similar effects.

The materials employed should be heated to such a temperature that the hydrochloric-acid gas may be decomposed, and its chlorine liberated. The decomposing-power of the metallic compounds remains permanently active, and the process is therefore a continuous one.

The chlorine thus produced will be found to be mixed with the vapor of water and with any hydrochloric acid which has escaped decomposition, or been afterwards formed, and also with the nitrogen of the atmospheric air employed, and also with any of the oxygen that may have been left uncombined.

The water and hydrochloric acid may be separated by condensation, and the chlorine may be absorbed from the remaining gases, and utilized in any well-known manner.

In this process, oxygen is the element required to unite with the hydrogen of the hydrochloric acid, and to set free the chlorine; any available supply of oxygen may therefore be employed, but atmospheric air is, I consider, the cheapest source.

In carrying out this process, one at least of the compounds employed must be of such a character that it will have the power of uniting with oxygen, either at the ordinary temperature or when heated, and when it is afterwards treated with hydrochloric acid, and heated either alone or in the presence of oxygen, it must possess the property of decomposing such acid, and of ultimately yielding chlorine as one of the results of the decomposition.

By applying this test to the metallic compound employed, the suitability of the mixture will be practically ascertained without difficulty.

My process is essentially a continuous one, and it depends upon the power of one or more of the compounds employed to cause the various reactions just described.

The hydrochloric-acid gas and air, which is by preference previously heated, are passed over the heated metallic compounds, which absorb more or less of the hydrochloric-acid gas, and become saturated therewith, the saturation depending in part upon the temperature employed, and then so long as the temperature remains constant, no further change is noticeable in the compounds, but the hydrochloric-acid gas and the oxygen of the air react on each other, in the presence of these compounds, and a continuous stream of hydrochloric acid and air entering the apparatus employed, results in the issue of a continuous stream of chlorine, and of the vapor of water, mixed of course with nitrogen from the air, unused oxygen, and hydrochloric acid.

There are several compounds which can be employed in carrying out my invention, of which salts of manganese, lead, and copper are usually the most available, either alone or in combination, as may be readily ascertained by applying the test above referred to.

Of these compounds, I prefer the compounds of copper, because of the high temperature necessary when using the compounds of manganese and lead, except when the compounds of manganese are employed as a diluent in order to prevent the fusing and caking of other more fusible compounds. Of the compounds of copper, I prefer the sulphate of copper, which may be employed in the following manner: Into a strong solution of sulphate of copper, I dip, or immerse, or impregnate common clay, or fire-clay bricks, or pipes, which, after saturation, I place in retorts or flues heated externally, and through which is made to pass, by means of pressure or draught, the heated mixture of hydrochloric-acid gas, (usually obtained from the manufacture of sulphates of soda or potash from their chlorides,) and atmospheric air, by which means and arrangement large surfaces of the compounds of copper are exposed to the action of the heated gases.

To obtain a successful result, attention must be paid to the temperature of the gases, which will vary according to the materials employed, say from about 400° Fahrenheit to 800°, or 850° Fahrenheit. If the temperature be raised to too high a point, it will be found that certain compounds of copper are volatilized, whilst on the other hand, if the temperature is allowed to fall too low, the decomposition becomes less active, and ultimately the hydrochloric-acid gas is absorbed, until the compounds become saturated therewith, and decomposition ceases. The apparatus is also slow in recovering its activity at the working-temperature, unless it be temporarily raised above it.

One advantage arising from the employment of compounds of copper, is the comparatively low temperature at which they act, but for practical purposes they require to be mixed with some other body or compounds, to prevent their fusing together. Burnt clay will be found to be efficient for this purpose.

With compounds of lead a full red heat must be employed, and then by preference only the chlorides and other soluble salts of lead, or compounds soluble in hydrochloric acid, are to be mixed with burnt clay, or other similar porous substances, as those only are suitable for the desired purpose. Indeed it may be stated that compounds of lead are not so advantageously employed as are the compounds of copper, owing to the increased temperature required, and the consequent difficulties thereby involved, arising in part from the volatility of the lead compounds. With the compounds of manganese, a still higher temperature than that required for compounds of lead is necessary, and excepting the non-volatility of compounds of manganese, the objections are greater against its employment than against the compounds of lead.

I annex a sheet of drawings illustrating one form of furnace which may be employed in carrying out my said invention. This furnace may either be composed entirely of brick-work, or it may consist of a cast-iron casing or chamber, filled with and set in brick-work. The latter, which is the one illustrated, is more costly in erection and repairs, but prevents more effectually any escape of the gases, or their dilution with the products of combustion from the smoke-flues.

In these figures—

1 is the fire-place or furnace proper, and 2 2 are the smoke-flues, which are arranged in zigzag fashion beneath and above the gas-heating and decomposing flues.

Figure 1:
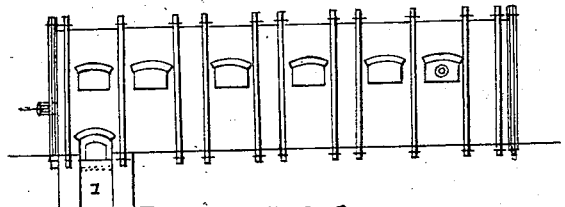
Figure 1 represents a side elevation of the chlorine-furnace.
Figure 2:
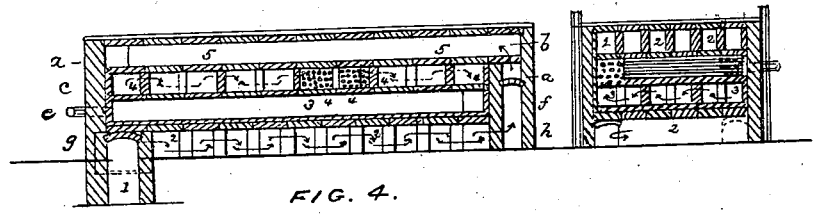
Figure 2 is a longitudinal vertical section of the same, taken along the line $i k$ in fig. 5.
Figure 3:
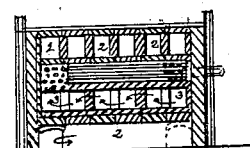
Figure 3 is a transverse vertical section, taken along the line $l m$ in fig. 2.
Figure 4:
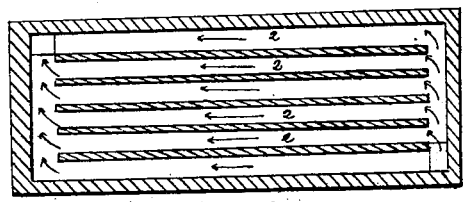
Figure 4 is a horizontal section, taken through the upper smoke-flue, along the line $a b$, fig. 2.
Figure 5:
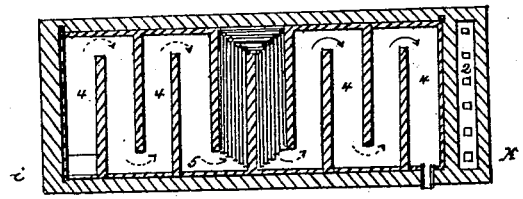
Figure 5 is a horizontal section through the gas-decomposing flue, along the line $c d$, fig. 2.
Figure 6:
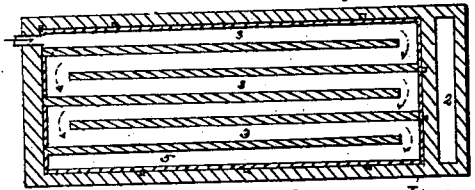
Figure 6 is a horizontal section through the gas-heating flue, taken along the line $e f$, fig. 2.
Figure 7:
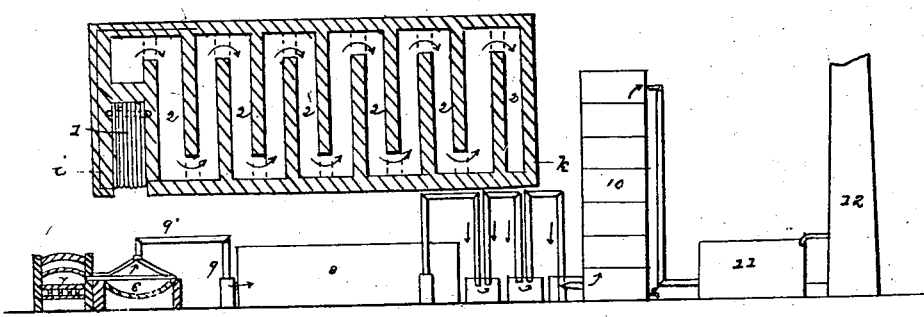
Figure 7 is a horizontal section through the bottom smoke-flue, taken along the line $g h$, fig. 2.

3 is the gas-heating flue, constructed in a zigzag form, the gas entering by an inlet-pipe, and after traversing the entire length of flue, passes into the zigzag decomposing-flues 4 4. These flues are filled with drain-pipes, (partly shown in figs. 2, 3, and 5,) soaked in solution of sulphate of copper, or other decomposing-material, as described herein.

7 is the gas-outlet pipe leading from the decomposing-flue to a condenser.

5 is a cast-iron chamber or casing, built inside the brick-work, and enclosing the gas-heating and decomposing flues 3 and 4, whereby an escape or loss of gas through leakage is entirely prevented. The casing 5 may be dispensed with, however, if desired.

Figure 8 of the drawings represents the combination of a chlorine-furnace, such as described above, with a close "salt-cake" or sulphate-of-soda furnace, condenser, and bleaching-powder chamber. In this figure—

6 represents the closed "salt-cake" pot or furnace.

7, the "salt-cake" oven or roaster.

8, the chlorine-furnace, of the same or similar construction to that hereinbefore described and illustrated, the supply of hydrochloric-acid gas being obtained from the "salt-cake" furnace or pot 6, by a pipe, 9, for that purpose, as shown.

9 9 are the cooling-pipes, leading to the bottom of the condensing-tower 10.

From the top of this tower, a pipe leads into a bleaching-powder chamber, 11, which communicates by a short pipe with the chimney 12.

A furnace, of the size given, will produce sufficient chlorine to make about three tons of bleaching-powder per twenty-four hours, with the experience which is at present possessed, but I believe, with further experience, this quantity will be materially increased.

This arrangement gives a current of chlorine varying in quantity, according to the evolution of hydrochloric-acid gas from the "salt-cake" furnace, which varies at each charge, being strong at the commencement and feeble at the end.

Where a uniform current of chlorine is required, several "salt-cake" furnaces may be arranged to one chlorine-furnace, and charged in rotation, one furnace-charge working off as another is beginning, and so on, or where a smaller but regular current of chlorine is required, I prefer to use an aqueous solution of hydrochloric acid, (as strong as convenient,) as the source of hydrochloric-acid gas. I evaporate this aqueous solution in any convenient manner, running into the evaporating-apparatus a constant stream of the aqueous acid, to maintain a constant stream of acid-vapor. This is mixed with the necessary quantity of air, and then passed through the chlorine-furnace.

When using aqueous hydrochloric acid, more vapor of water, in proportion to the chlorine, passes through the apparatus, which necessitates provision in the size and proportion of the various parts of the apparatus, which will be evident to practical men.

The aqueous hydrochloric acid, as obtained from the ordinary "salt-cake" process, is fit for use in this way, and by its use the two processes of "salt-cake" and chlorine making can be separately and simultaneously conducted.

It will be noticed that I prefer to heat the hydrochloric-acid gas and the atmospheric air, before passing them into the decomposing-portion of the apparatus.

The arrangement given, has the advantages of compactness, and keeps the intense heat of the fire from the compounds of copper, but the apparatus may be varied to a great extent, and in particular the primary heating of the gases may be effected in one apparatus, and the decomposition in another, and it must be borne in mind that the decomposition itself is attended with evolution of heat, and therefore with a properly-regulated supply of heated hydochloric-acid gas and air, and suitably-protected decomposing-apparatus, the latter will require but little or no external application of heat, but the working-temperature can be maintained by due attention to the temperature of the current of gases passing into the decomposing-apparatus.

Various methods by which the waste heat of the "salt-cake" furnaces may be employed for heating these gases, will suggest themselves to practical men.

Hydrochloric-acid gas passed through the apparatus, must be mixed with so much air as will give rather more than one equivalent of oxygen for every two equivalents of hydrogen contained in the hydrochloric-acid gas. It is not necessary to dry the air previously, but its carbonic-acid gas can be previously removed, if desired, by use of lime or of alkaline solutions, as is well understood.

The gases issuing from the furnaces will consist of chlorine, of the nitrogen of the air, of any surplus or uncombined oxygen, the vapor of water, undecomposed hydrochloric-acid gas, and any other gases, either present in the air or originally mixed with the hydrochloric-acid gas, or which may have leaked into the apparatus; in other words, the chlorine will be largely diluted, and probably mixed with more or less carbonic-acid and other gases.

The hydrochloric-acid gas and vapor of water may be removed from the mixture by condensation and cooling alone, and the subsequent use of a scrubber, or of a column of dry coke, to remove water mechanically carried with the current, is usually sufficient. Otherwise the condensation can be completed by the use of a dilute solution of hydrochloric acid, which absorbs mere traces of chlorine, but usually enough hydrochloric acid exists in the gases to condense in the water, and expel the chlorine therefrom, and then water alone is necessary.

The chlorine present is left available for all purposes not interfered with by its dilution with the gases before named, as, for example, for the manufacture of bleaching-powder, especially when not required of the highest strengths, and also for the manufacture of other products, such as chlorate of potash.

Having now described my invention, I wish it to be understood that I do not claim the use of chloride of copper for the production of chlorine from hydrochloric acid by successive operations, such as evolving part of the chlorine from the chloride of copper by heat, and then oxidizing the sub-chloride, thus produced, and subsequently adding hydrochloric acid to this sub-chloride, in order to reproduce the chloride of copper ready for the recurrence of the operations, which is an intermittent process; nor do I claim the use of chloride of manganese along with liquid or aqueous hydrochloric acid and heated air for the production of chlorine; but

What I claim as my invention, is—

1. The continuous production of chlorine, by passing a current of hydrochloric-acid gas and atmospheric air, by preference in a heated condition, over heated compounds, such as those hereinbefore referred to, which, or one of the elements of which must have the power of absorbing oxygen, either before being heated or when heated, and must possess, when subsequently treated with hydrochloric acid, and heated, either alone or in the presence of oxygen, the power of decomposing such acid, and of ultimately yielding chlorine as one of the results of the decomposition.

2. The continuous production of chlorine, by passing, as above described, a current of hydrochloric-acid gas and atmospheric air, by preference in a heated condition, over heated substances, porous or otherwise, which are impregnated or mixed with metallic compounds, such as are hereinbefore mentioned and described.

In testimony whereof, I have signed my name to this specification, in the presence of two subscribing witnesses.

HENRY DEACON.

Witnesses:
JOHN CHALER,
  *Of Albion Foundry, Liverpool, Engineer.*
L. F. VOIGT,
  *Liverpool, Engineer.*